July 1, 1958 M. J. STATEMAN 2,841,645

TELEVISION RECEIVER

Filed March 14, 1955 2 Sheets-Sheet 1

INVENTOR.
MURRAY J. STATEMAN
BY
Morton Amster
ATTORNEY

July 1, 1958 M. J. STATEMAN 2,841,645

TELEVISION RECEIVER

Filed March 14, 1955 2 Sheets-Sheet 2

INVENTOR.
MURRAY J. STATEMAN
BY
Morton Amster
ATTORNEY

United States Patent Office 2,841,645 Patented July 1, 1958

2,841,645

TELEVISION RECEIVER

Murray J. Stateman, Wantagh, N. Y., assignor to Sylvania Electric Products Inc., a corporation of Massachusetts Application March 14, 1955, Serial No. 493,935

19 Claims. (Cl. 178—7.3)

The present invention relates to television receivers, and in particular to a system for improving television reception. Specifically, the invention is concerned with the reduction of transient noise at the television receiver to assure good picture quality, and to the substantial reduction of "snow" due to random noises, tube nonlinearity, noises generated within the equipment, noises generated in adjacent electrical installations, and atmospheric noises.

Numerous studies have been made of the video power spectrum with a view to a practical approach to the problem of minimizing the effects of transient noise, and specifically reducing such transient noise to improve picture quality of television receivers. It is known that the television signal spectrum which occupies four megacycles, consists of alternate bands or clusters of used and unused frequencies. The bands or clusters center about frequencies which are integral multiples of the horizontal scan frequency. Within each band or cluster are satellite energy bands centered at frequencies which are separated from the cluster center by integral multiples of the field rate. Thus, the four megacycle video band is occupied by a number of narrow bands resulting more or less from the modulation of all of the harmonics of the horizontal scanning frequency by all of the harmonics of the field rate. Between these bands or clusters lie frequency bands which contain a negligible amount of signal information; however, such unused bands are very likely to contain as much noise power per cycle as occurs in the used bands. The existence of the unused band between the clusters or alternate bands of used frequencies is demonstrated by color television systems in which color information is carried in the unused bands without any detrimental effect on the brightness information making up the black and white spectrum of the conventional television signal.

Broadly, it is an object of the present invention to provide a system for reducing transient noise in a television receiver. Specifically, it is within the contemplation of the present invention to modify standard television receivers to achieve improvement in the signal-to-noise ratio.

With the knowledge of the video spectrum, it has been suggested that improved television reception may be achieved by blocking out those frequencies within the four megacycle pass band which do not contain television signals. This suggested approach would involve creating a filter which discriminates against those frequency regions carrying negligible television signals, yet in all probability containing as much noise power per cycle as in the bands carrying the television signals. However, as a practical matter, such approach would require the design of an exceptionally complicated filtering network. Such a filtering network for the four megacycle video band would require at least 254 individual pass bands to discriminate against the 254 unused bands between clusters of information; and many more pass bands if the unused bands between satellites are to be filtered out. Such filtering networks, referred to as "matched" of "comb" filters having transfer characteristics coinciding with the signal spectrum, have been described in an article by J. Van Vleck and V. Middleton entitled The Theoretical Comparison of the Visual, Aural and Meter Reception of Pulse Signals in the Presence of Noise, appearing in the Journal of Applied Physics, vol. 17, of November 1946.

It is a further object of the present invention to provide a noise rejection system for a television receiver which discriminates against frequency regions or bands carrying negligible usable signal energy. Specifically, it is within the contemplation of the invention to obviate the need for complex filtering systems in eliminating or reducing noise power in television receivers.

A consideration of a television picture indicates that there is little variation in the brightness level over small areas of the scene. Thus, the television picture may be characterized generally as being "redundant;" that is, the signal amplitude does not change appreciably between adjacent picture elements in the horizontal direction, the signal amplitude does not change appreciably between adjacent pictures in the vertical direction, and there is very little change in brightness level of a given element within the scene in successive fields.

In marked contrast, it has been observed that noise appearing on the television screen takes the form of elemental regions whose brightness differs considerably from that of adjacent elemental regions of the picture information. Since the noise is a transient, the brightness level of elemental regions changes between adjacent picture elements in either the horizontal or vertical directions and is very different from that in the same area as previous fields or frames.

The present invention makes use of the realization that the television picture is redundant and the noise is random, as compared to either adjacent picture elements in the horizontal direction, adjacent picture elements in the vertical direction, or corresponding picture elements in successive fields or frames. The systems to be described hereinafter for improvement of signal-to-noise ratio, are based upon the assumption that signal redundancy in adjacent or corresponding picture elements are expected, while random brightness fluctuations are not expected; by employing circuits which limit the amount of change in brightness in adjacent or corresponding elements to that range expected for signals without noise, better picture quality is obtained through a corresponding reduction of random changes in signal levels.

In accordance with the concepts of the present invention, a comparison is made between corresponding incoming and previously received signals; and when an incoming signal compared with a previously received signal lies outside of a reasonable range of amplitude change, the incoming signal is modified to bring the same within said reasonable range. Thus, there is provided a restraint on a signal-with-noise, such that the amplitude difference between signal voltages representing the brightness of corresponding picture elements are within a predetermined range. As will appear hereinafter, corresponding picture elements are those pairs which are adjacent on the same horizontal lines; those pairs which are adjacent vertically; and those pairs which are in the same location in successive fields or frames. The brightness difference between elements of a signal pair is small because of the inherent redundancy of the television signal; and the range of amplitude variation allowed by the restraining circuits is sufficient to be generally effective for coherent picture display in accordance with the principles hereinafter outlined in detail.

The above and still further objects, features and advantages of the present invention will be best appreciated by detailed reference to presently preferred illustrative embodiments, when taken in conjunction with the accompanying drawings, wherein.

Figure 1:
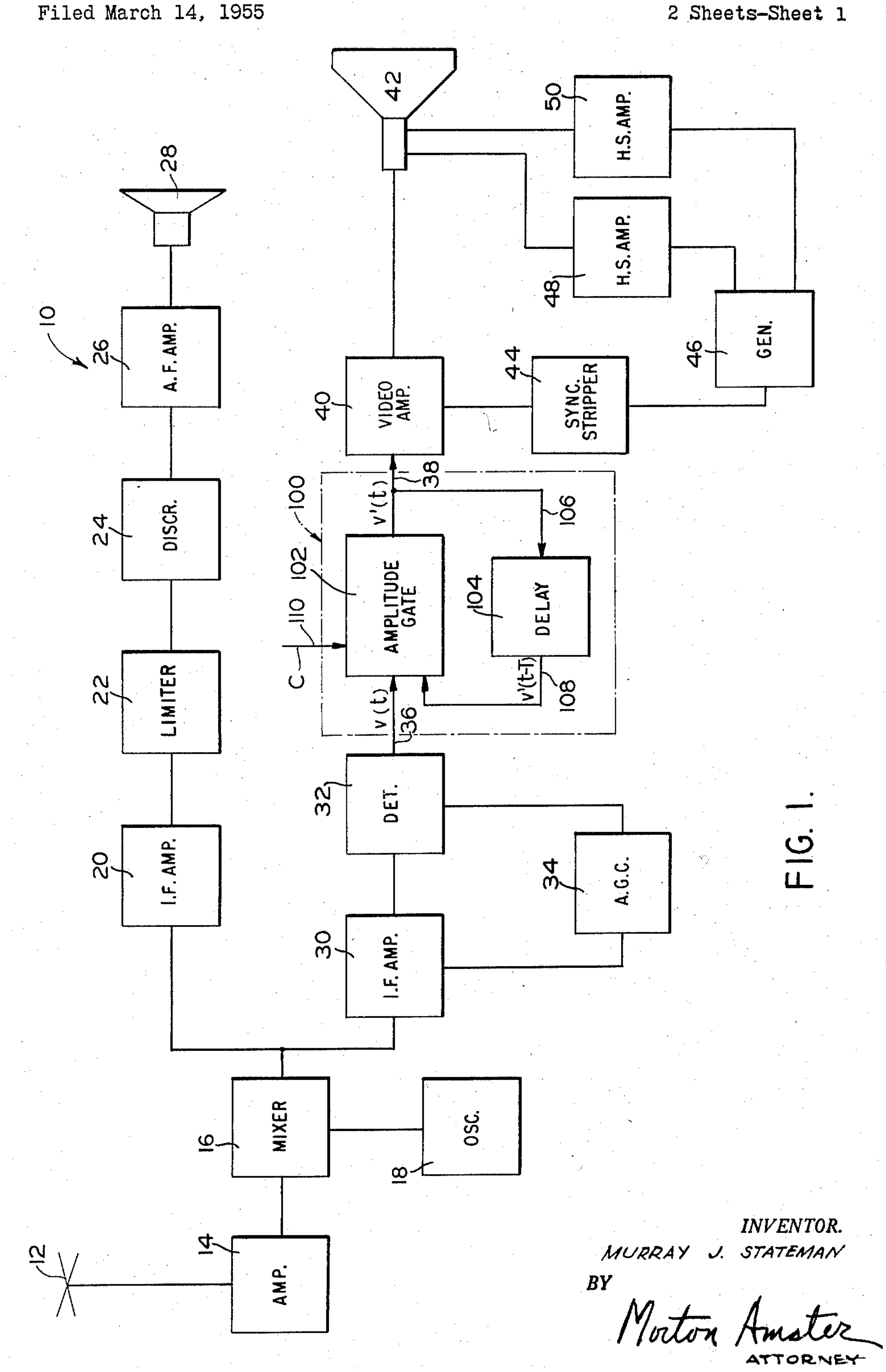
Fig. 1 is a block diagram showing a standard television receiver including a noise level reduction system embodying features of the present invention.

Prior to a detailed description of the illustrative embodiments, the theory of operation herein will be further enlarged to facilitate a more thorough understanding of the illustrative embodiments. As previously pointed out, one may compare the signal amplitudes of corresponding elements separated in time by a field or frame period, that is one-sixtieth or one-thirtieth of a second; signal amplitudes of corresponding elements separated in time by the time of the line scan, that is the reciprocal of 15,750 which is the frequency of the horizontal scanning; or signal amplitudes of corresponding elements separated in time by the lapsed time between adjacent picture elements. Adjacent picture elements as considered herein may be defined in terms of video bandwidth and resolution. The width of the picture element is the length of the line scanned in the time required to change the brightness level from one extreme to the other. The shortest time in which it is possible to change the brightness over its extreme range is one-half the period of the highest frequency component. Thus, the width of the picture element corresponds to the portion of a line scanned in one eight millionth of a second. Neglecting the blanking periods, there are 508 picture elements per line, which figure is derived by dividing the line scan period by one-half the period of the highest video frequency component. Any change in bandwidth of the video spectrum results in a change of the size of the picture element and consequently in the resolution to be obtained on the screen.

If the restraint were placed on the signal amplitude difference between adjacent picture elements on the same line, the resolution in the horizontal direction would necessarily be limited. This results in a reduction in the horizontal fine detail on the television screen, that is the horizontal complexity. Such restraint corresponds to attenuation of signal power at the high end of the video band.

If the restraint is placed on signal amplitude differences between vertically adjacent elements, that is corresponding elements in successive lines of a field, it would result in limiting of the vertical complexity without effecting the horizontal complexity. The full four megacycle range would still be required to portray the horizontal information, but now there would be limitation on the spectrum within that range. The spread of energy in the clusters centering about the multiples of the line frequency is restrained when the variations in brightness of corresponding picture elements from line to line is restrained.

If the restraint is placed on the signal amplitude difference between corresponding elements in adjacent fields, as in the illustrative embodiments detailed hereinafter, motion complexity is somewhat limited. Considering the video spectrum, the energy spread about the satellite spikes of the clusters would necessarily be restrained.

In the illustrative embodiment to be described, the signal amplitude of corresponding elements separated in time by one field period is compared and the restraint applied to signals whose amplitudes lie outside of a permissible range. Corresponding elemental signals may be restricted to reasonable variations, as determined experimentally, or as established arbitrarily. For example, it may be assumed that there are 64 distinguishable shades of gray between black and white in standard television reception. Any picture element may take on any one of these shades. However, it may be established that a reasonable variation in brightness between corresponding picture elements is eight shades of gray, this figure being subjective and susceptible to a latitude of variation. If the variation between corresponding elements is not allowed to exceed eight shades of gray, then the system is restrained so that the time lag in going from complete black to complete white is the time required to scan eight fields, which is approximately .13 second. Such a time lag in going to complete black to complete white, would occur during a change of scene, and upon switching of channels; in either eventuality such a short time delay is of no consequence in the adequate performance of the television system. In comparing corresponding elements separated in time by one frame period, a memory or storage device is required for the storage of a signal from the last field for comparison with the incoming corresponding signal. If the difference between the amplitude of the previous signal and the incoming signal lies within the predetermined range, the incoming signal is passed through the television system unchanged. The incoming signal is then stored in place of the previous signal for subsequent use in comparison with the next incoming signal. If, however, the incoming signal lies outside of the predetermined range, it will be modified so that the resultant signal falls at either the upper or lower limit of the range. The modified signal is then passed on through the television system and is also stored in the system for comparison with the next incoming signal.

Referring now specifically to Fig. 1, there is shown in block diagram form a conventional television receiver 10 including a noise level reduction system 100 demonstrating features of the present invention. The receiver 10 has a common front end capable of handling the combined visual and aural signals which includes an antenna 12, an amplifier 14, a mixer 16 and an oscillator 18. The common front end of the receiver is followed by two independent I. F. and output chains, one for the detection of the aural signals and the other for the detection of video signals. The aural detection channel includes an audio intermediate frequency amplifier 20, a limiter 22, a discriminator 24, an audio amplifier 26, and a speaker output 28. These will be recognized as the components of a conventional FM receiver, which serve to demodulate the FM carrier, the audio voltage being amplified and fed to the loud speaker 28. The video chain includes a video intermediate frequency amplifier 30 feeding a detector 32 with suitable provision for automatic gain control 34. The output of the video detector is fed as an input signal to the noise reduction system 100 via the lead 36. The output 38 from the interposed noise reduction system 100 is fed to a video amplifier 40. Signal output from the video amplifier is fed to the control grid of the cathode ray tube 42 where it serves to modulate the light output of the fluorescent screen; a positive version of the same signal is fed to the sync stripper 44 which removes the picture information and sends the sync signals to the sweep systems, which includes the horizontal sweep generator 46 feeding respectively the horizontal sweep amplifier 48 and the vertical sweep amplifier 50. The television receiver shown in Fig. 1 is conventional except for the noise reduction system 100 between the video detector 32 and the video amplifier 40. This may be appreciated by comparison with known circuits wherein the leads 36, 38 are directly connected to each other to couple the output of the video detector 32 directly to the video amplifier 40. In that the television receiver is conventional, and merely shows a typical environment for the noise reduction system 100, further description will be dispensed with.

Still making reference to Fig. 1, the general operation of the noise reduction system will be described; a detailed discussion of the several components of the system will be made in conjunction with Figs. 2 and 3. As seen in Fig. 1, the system 100 includes an amplitude gate which has a signal input connection 36 from the video detector 32 and has a signal output connection 38 to the video amplifier 40. A delay circuit 104 derives its input via lead 106 from the output connection of the amplitude gate 102 and applies its output via the connection 108 as a further signal input to the amplitude gate 102. The amplitude gate has a still further input connection 110, from a source of control voltage (not shown). The following general notation will serve as an aid to an understanding of the general characteristics of the noise-reduction system 100, generally illustrated in Fig. 1. The designation $v(t)$ applied to the signal input connection 36 represents the actual signal input at the present time $(t)$; the notation $v'(t)$ represents the modified signal at the present time $(t)$; the notation $v'(t-T)$ applied to the output of the delayed circuit 104 which serves as a further input to the amplitude gate 102 represents the modified and delayed corresponding signal; and the notation C applied to a signal input connection 110 is the control voltage which establishes the maximum tolerable deviation between corresponding signal elements, as arbitrarily selected.

In Fig. 1 the incoming video signal $v(t)$, after the video detector 32, is compared to the delayed and possibly modified signal $v'(t-T)$ in the amplitude gate 102. The amplitude gate is constructed and arranged to pass the incoming signal $v(t)$ only if the incoming signal lies within the range $v'(t-T)\pm C$, where, as previously pointed out, C is the maximum tolerable deviation between corresponding signal elements. When $v(t)$ lies outside the range C, the signal is modified within the amplitude gate 102, so that it falls at the proper extreme of the specified range. The modified output signal $v'(t)$ is then fed to the deflection and video circuits as illustrated, as well as to the delay and storage circuit 104 where it is held for comparison with and control of the next corresponding incoming signal.

Figure 2:
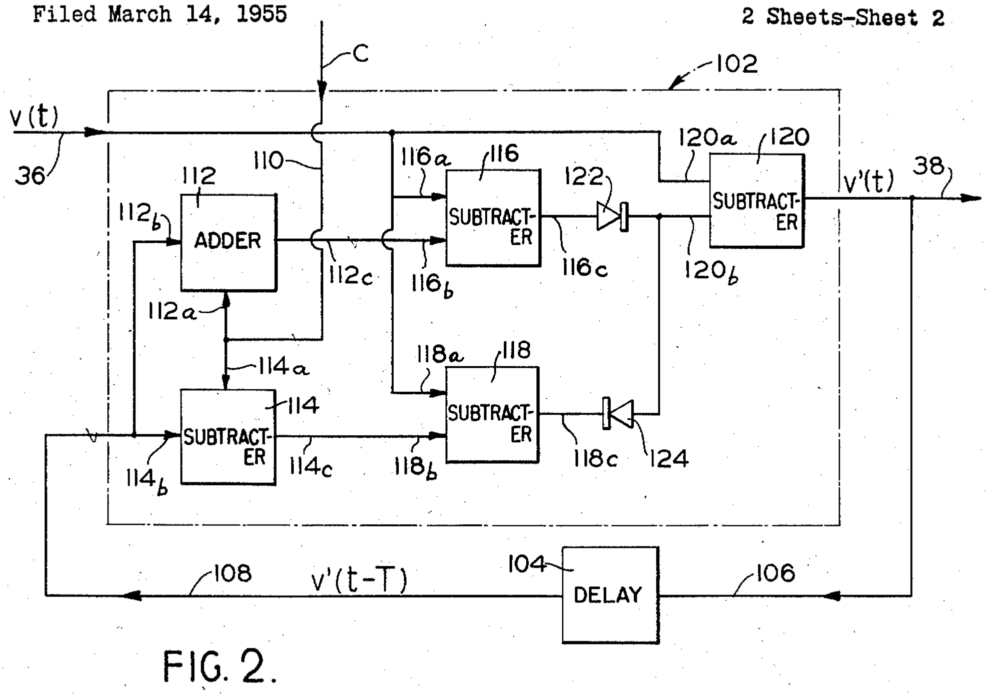
Fig. 2 is a block diagram of one form of noise level reduction system embodying features of the present invention; and, Fig. 3 is a block diagram of another form of noise level reduction system embodying still further features of the present invention.

Referring now specifically to Fig. 2, there is shown in greater detail the circuits within the block 100. The amplitude gate includes an adding circuit 112 and a subtracting circuit 114, each having two input terminals terminals **112*a*, 112*b*, and 114*a*, 114*b*. The input terminals 112*a*, 114*a* of the circuits 112, 114 are connected to the input connection 110; while the input connections 112*b*, 114*b* are connected to the output connection 108 of the delay and storage device 104**.

The amplitude gate further includes subtracting circuits 116, 118 and 120, each of which has two input connections and one output connection. The input connections **116*a*, 118*a*, and 120*a* of the subtracting circuits 116, 118, 120 are connected to the input line 36 which derives signals from the video detector 32. The input connection 116*b* of the subtracting circuit 116, derives its input from the output connection 112*c* of the adding circuit 112; the input connection 118*b* of the subtracting circuit 118 derives its input from the output connection 114*c* of the subtracting circuit 114; and the input connection 120*b* of the subtracting circuit 120*b* derives its input from the output connection 116*c* of the subtracting circuit 116 via a unidirectional device 122 which is biased in the forward direction. The unidirectional device 122 may be a crystal diode and is poled such as to pass only positive signals. The input terminal 120*b* derives further input signals from the output connection 118*c* of the subtracting unit 118 via the unidirectional device 124 which is biased in the back direction, that is poled to pass only negative signals from the subtracting circuit 118. The respective adding and subtracting circuits 112, 114, 116, 118 and 120 are well known in the art in that they find widespread application in computers, and accordingly will not be described in detail herein. Suitable high gain DC amplifiers having appropriate input and feedback connections may perform the required arithmetic operations, such circuits being described in a textbook by W. W. Soroka, published by McGraw-Hill Book Co., Inc., in 1954 and entitled Analogue Methods in Computation and Simulation. For example, the adding circuits may be multiple grid tubes operating in the linear range, or magnetic amplifiers having isolated signal circuits; the subtracting circuits 114 may be similar to the adding circuits except for the inversion of one of the signal input connections. Accordingly, a latitude of substitution is intended in the specific circuitry which may be employed within the respective blocks, 112, 114, 116, 118 and 120**.

The operation of the noise reduction system illustrated in Fig. 2 will now be described in detail to facilitate a more thorough understanding of the invention:

As previously pointed out, a maximum allowable range of the compared and possibly modified signal $v'(t)$ is $v'(t-T)\pm C$. These limiting levels are obtained by the first pair of circuits 112, 114, the adding circuit 112 serving to provide signal output at the connection **112*c* corresponding to the upper limit level and the subtracting circuit 114 providing signal output at the connection 114*c* corresponding to the lower limit level. The incoming signal $v(t)$ applied at the terminals 116*a*, 118*a* of the subtracting circuits 116, 118** is compared with the high and low limiting levels.

If, for example, $v(t)$, as applied from the output of the video detector via the lead 36, is too high, that is, greater than the value $v'(t-T)\pm C$, then there is a positive output from the subtracting circuit 116 which is passed through the appropriately poled rectifier 122 to the input terminal **120*b* of the final subtracting circuit 120. Although the signal $v(t)$ which is too high is likewise applied as input coincidentally with the signal on the lead 118*b*, the subtracting circuit 118 does not provide output to the input terminal 120*b* of the subtracting circuit 120 due to the presence of the unidirectional device 124, which is poled to pass only negative signals. Thus, a correction voltage is available at the input terminal 120*b*** indicative of the incoming signal $v(t)$ exceeding the upper limit of the permissible deviation range.

When the incoming signal $v(t)$ is too low, that is smaller than the quantity $v'(t-T)-C$ there is a negative output from the subtracting circuit 118 which is passed through the half-wave rectifier 124 as a correction voltage to the input connection **120*b* of the subtracting circuit 120. As before, although there is a negative output at the terminal 116*c* of the subtracting unit 116, the same is effectively blocked from the input connection 120*b* of the subtracting unit 120 due to the properly poled half-wave rectifier 122**.

When the signal $v(t)$ lies within the permissible range, there is no signal input applied at the connection **120*b***.

The final subtracting circuit **120*b* passes the signal $v(t)$ as a compared and unmodified signal $v'(t)$ to the output terminal 38 when no correction voltages are applied at the input terminal 120*b*; that is the condition when the voltage $v(t)$ lies within the permissible deviation range. However, when positive or negative correcting voltages are applied at the terminals 120*b* from the appropriate output terminals of the subtracting circuits 116, 118, the signal $v(t)$ is modified to the value of the upper or lower limits of the permissible range, as determined by the polarity of the voltage at the terminal 120*b***.

In the illustrative form, where corresponding picture elements are taken as corresponding signals in successive fields, the delay in circuit 104 required for comparison of signals is .0167 second; if the comparison is to be made of corresponding signals in successive frames, the delay in the circuit 104 is established at .033 second. From the order of the time delay, it is apparent that the circuit 104 must be both a delay and memory storage device. High speed storage devices for the rapid read-in and read-out of information are well known to the art, and include such devices as cathode ray tube storage units. By selecting the delay to compare signals in successive fields, a further important advantage is derived. Not only are the corresponding picture elements compared for the purpose of improvement in signal-noise ratio, but further, the horizontal and vertical sync pulses will likewise be compared with corresponding preceding horizontal and vertical sync pulses. Thus, as a practical matter, if a later horizontal or vertical sync pulse is missing from the video picture information applied as the signal $v(t)$, the circuits described will approximately repeat the previously stored horizontal or vertical sync pulse as the compared and modified signal output $v'(t)$ at the appropriate instant in time of signal input.

Figure 3:
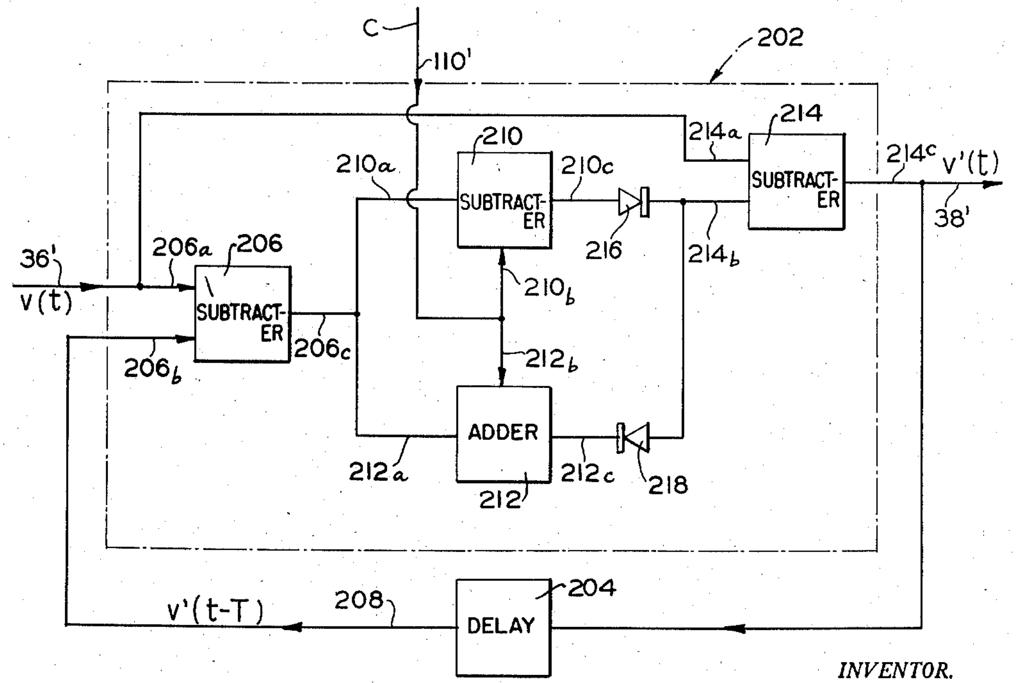

Reference will now be made to Fig. 3, wherein there is shown a modified form of noise reduction system 200 which may be interposed between the video detector output 36' and the video output amplifier 38', the unit 200 including an amplitude gate 202 and a delay circuit 204. The amplitude gate 202 includes a subtracting circuit 206 having two input connections 206*a*, 206*b* and an output connection 206*c*. The subtracting circuit has one of the input connections 206*a* coupled to the output 36' of the video detector to receive unmodified signals $v(t)$ and has the other of its input connections 206*b* coupled to the output 208 of the delay device 204 to receive the compared and possibly modified signal $v'(t-T)$ as its further input. The circuit 206 serves to subtract the delayed modified signal input $v'(t-T)$ from the incoming signal $v(t)$ which difference is compared for allowable range setting C by the subtracting and adding circuits 210, 212. The subtracting circuit 210 includes two input connections 210*a*, 210*b* and an output connection 210*c*; and the adding circuit 212 includes two input connections 212*a*, 212*b* and an output connection 212*c*. The input connections 210*a*, 212*a*, of the circuits 210, 212 are connected to the output connection 206*c* of the circuit 206, while the input connections 210*b*, 212*b* are connected to the voltage source C via the line 110'. The gating circuit 202 further includes a final subtracting circuit 214 having two input connections 214*a*, 214*b* and an output connection 214*c*. The input connection 214*a* is connected to the line 36' to receive the unmodified signal $v(t)$ while the output connection 214*c* serves to pass the compared and possibly modified signal $v'(t)$ to the output line 38'. The input connection 214*b* derives signals from the output terminals 210*c*, 212*c* and through the properly poled rectifiers 216, 218. The subtracting circuit 210 serves to compare the difference between the signals $v'(t-T)$ and the incoming signal $v(t)$ with the control voltage C. If the difference is too large in the positive direction, a correction voltage is applied via the properly poled rectifier 216 to the input connection 214*b* of the final subtracting circuit 214. If the difference is too large in the negative direction, a correction voltage is applied from the circuit 212 via the properly poled rectifier 218 to the input connection 214*b*. However, if the absolute value of the difference between the signal inputs to the circuit 206, as found at the output terminal 206*c* is less than the maximum permissible signal deviation C, no error signals are applied to the unit 214.

From the foregoing, it will be appreciated that the preferred form of the invention is one in which the corresponding signals are those in successive fields or frames in that the added advantage of comparison of successive horizontal and vertical sync pulses is also achieved. From the standpoint of the ultimate user, especially those in a weak or fringe area, there is the very pressing problem of maintenance of the synchronizing signals. However, within the contemplation of the present invention is the use of average values of signals of previous elements (either line or frame) as the preferred value of the signal $v'(t-T)$. Although this will yield an excellent reference for the incoming signal to be compared to $v(t)$, modification of the circuits are required by the addition of delay components and there is no direct improvement in the sync signals as previously pointed out. Such average signal, either line by line or frame would be derived by averaging several elements along the line, or several previous corresponding points in successive frames.

It is further within the contemplation of the invention to use the signal of the picture element just prior to the incoming picture element $v(t)$ as the reference signal. However, in this eventuality, difficulty arises and at the beginning and end of each line upon the occurrence of a horizontal sync pulse, unless provision is made for blanking out such horizontal sync pulse.

What is claimed is:

1. In a television receiver, a system for comparing the amplitude of an incoming signal with a corresponding signal and for preventing variations in amplitude from exceeding a preset range comprising an amplitude gate including a control voltage source establishing said preset range and having at least two signal input connections and a signal output connection, means for applying incoming signals to one of said input connections, and delay means deriving its input from said output connection of said amplitude gate and applying its output to the other of said input connections, said delay means having a time delay at which said incoming signal and a gated and delayed output signal from said amplitude gate arrive in signal coincidence at the output connections of said gate.

2. In a television receiver according to claim 1, said amplitude gate including an adding circuit having two input terminals and an output terminal, first, second, third and fourth subtracting circuits each having two input terminals and an output terminal, said adding circuit and said first subtracting circuit each deriving one signal input from said other input connection and the other signal input from said control voltage source, the signal on the output terminal of said adding circuit corresponding to the upper limit of said preset range and being applied to one input terminal of said second subtracting circuit, the signal on the output terminal of said first subtracting circuit corresponding to the lower limit of said preset range and being applied to one input terminal of said second subtracting circuit, the signal on the output terminal of said first subtracting circuit corresponding to the lower limit of said preset range and being applied to one input terminal of said third subtracting circuit, said second and third subtracting circuits each deriving their other signal input from said one input connection, said fourth subtracting circuit having one signal input terminal deriving signals from said one input connection, a first unidirectional device coupling the output terminal of said second subtracting circuit to the other input terminal of said fourth subtracting circuit and poled to pass only positive signals, and a second unidirectional device coupling the output terminal of said third subtracting circuit to the other input terminal of said fourth subtracting circuit and poled to pass only negative signals.

3. In a television receiver according to claim 1, said amplitude gate including an adding circuit having two input terminals and an output terminal, and first, second and third subtracting circuits each having two input terminals and an output terminal, said first subtracting circuit having one input terminal connected to said one input connection and having the other input terminal connected to said other input connection, said adding circuit and said second subtracting circuit each having one input terminal connected to the output terminal of said first subtracting circuit and each having the other input terminal connected to said control voltage source, said third subtracting circuit having one input terminal connected to said one input connection, a first unidirectional device coupling the output terminal of said second subtracting circuit to the other input terminal of said third subtracting circuit and poled to pass positive signals, and a second unidirectional device coupling the output terminal of said adding circuit to the other input terminal of said second subtracting circuit and poled to pass negative signals.

4. A system for comparing the amplitude of a first signal with a second signal having a predetermined time delay and for preventing variations in amplitude from exceeding a preset range in relation to said second signal comprising an amplitude gate including a control voltage source establishing said preset range and having at least two signal input connections and a signal output connection, means for applying said first signal to one of said input connections, and delay means deriving its input from said output connection of said amplitude gate and applying its output to the other of said input connections, said delay means having a time delay at which said first signal and the gated and delayed output from said amplitude gate as said second signal arrive in signal coincidence at the input connections of said gate.

5. In a television receiver, a system for comparing the amplitude of an incoming signal with a corresponding signal in the preceding field and for preventing variations in amplitude from exceeding a preset range in relation to said corresponding signal comprising an amplitude gate including control voltage source establishing said preset range and having at least two signal input connections and a signal output connection, means for applying incoming signals to one of said input connections, and delay and storage means deriving its input from said output connection of said amplitude gate and applying its output to the other of said input connections, said delay and storage means having a time delay of one field period such that there is coincident signal input to said amplitude gate of an incoming signal and a gated and delayed output signal.

6. In combination with a television receiver including a video detector and a synchronous clipper, a noise level reduction system connected between said detector and clipper, said system comprising an amplitude gate having two input connections, a control connection, and an output connection, one of said input connections receiving video signals from detector, a source of control voltage connected to said control connection and establishing a maximum allowable range of amplitude change for said video signals, said amplitude gate including a circuit for passing video signals having amplitudes within said range without modification and for passing video signals below and above said range as modified video signals at the lower end upper limits of said range, delay means deriving its input from said output connection and applying its output to the second input connection of said amplitude gate, said delay means introducing a time delay at which an incoming video signal and a corresponding video signal after gating and delay and with or without modification arrive in signal coincidence at the input connections of said gate.

7. In combination with a television receiver including a video detector and a synchronous clipper, a noise level reduction system connected between said detector and clipper, said system comprising an amplitude gate having two input connections, a control connection, and an output connection, one of said input connections receiving video signals from said detector, a source of control voltage connected to said control connection and establishing a maximum allowable range of amplitude change for said video signals, said amplitude gate including a circuit for passage video signals having amplitudes within said range without modification and for passing video signals below and above said range as modified video signals at the lower and upper limits of said range, a memory device deriving its input from said output connection and applying its output to the second input connection of said amplitude gate, said memory device having a time delay at which an incoming video signal and a corresponding video signal after gating and delay and with or without modification arrive in signal coincidence at the input connections of said gate.

8. A noise level reduction system comprising an amplitude gate having two input connections, a control connection, and an output connection, one of said input connections receiving video signals, a source of control voltage connected to said control connection and establishing a maximum allowable range of amplitude change for said video signals, said amplitude gate including a circuit for passing video signals having amplitudes within said range without modification and for passing video signals below and above said range as modified video signals at the lower and upper limits of said range, delay and storage means deriving its input from said output connection and applying its output to the second input connection of said amplitude gate, said delay and storage means having a time delay at which an incoming video signal and a corresponding video signal after gating and delay and with or without modification arrive in signal coincidence at the input connections of said gate.

9. In combination with a television receiver including a video detector and a synchronous stripper, a noise level reduction system connected between said detector and clipper, said system comprising an amplitude gate having two input connections, a control connection, and an output connection, one of said input connections receiving video signals from detector, a source of control voltage connected to said control connection and establishing a maximum allowable range of amplitude change for said video signals, said amplitude gate being provided with means to pass video signals having amplitudes within said range without modification and to pass video signal below and above said range as modified video signals at the lower and upper limits of said range, delay means deriving its input from said output connection and applying its output to the second input connection of said amplitude gate, said delay means introducing a time delay of one field period for coincident signal input at said input connection of an incoming video signal and a corresponding video signal of the preceding field after gating and delay and with or without modification.

10. A system for improving the signal-to-noise ratio in a television receiver comprising first means for comparing the amplitude of an incoming signal with a previously received signal, second means for establishing lower and upper limits for amplitude change in successive signals, and third means responsive to said second means for modifying said incoming signal when the amplitude thereof falls outside of said lower and upper limits for amplitude change.

11. A system for improving the signal-to-noise ratio in a television receiver comprising first means for establishing a permissible range of amplitude variation having lower and upper amplitude limits for an incoming signal and a corresponding previously received signal, a comparator for comparing said incoming signal with both said lower and upper amplitude limits of said permissible range of variation, said comparator including a circuit for providing correction signals of different polarities respectively indicating that said incoming signal is of an amplitude below and above said permissible range, and second means under control of said correction signals for modifying said incoming signal.

12. In a television receiver, a system for comparing the amplitude of an incoming signal with a corresponding signal and for preventing variations in amplitude from exceeding a preset range comprising first means including a control voltage source establishing said preset range and having at least two signal input connections and a signal output connection, second means for applying incoming signals to one of said input connections, a delay device deriving its input from said output connection and applying its output to the other of said input connections, said device having a time delay at which coincident signal input to said amplitude gate of an incoming signal and a gated and delayed output signal from said amplitude gate is established, and a video amplifier deriving its input from said output connection.

13. In a television receiver, a system for comparing the amplitude of an incoming signal with a corresponding signal and for preventing variations in amplitude from exceeding a preset range comprising an amplitude gate establishing said preset range and having at least two input connections and a signal output connection, first means for applying incoming signals to one of said input connections, and a delay device deriving its input from said output connection of said amplitude gate and applying its output to the other of said input connections, said device having a time delay at which coincident signal input to said amplitude gate of an incoming signal and a gated and delayed output signal from said amplitude gate is established, said amplitude gate being arranged to modify incoming signals having variations in amplitude which exceed said preset range.

14. In combination with first and second input connections and a control voltage source, an amplitude gate including an adding circuit having two input terminals and an output terminal, first, second, third and fourth subtracting circuits each having two input terminals and an output terminal, said adding circuit and said first subtracting circuit each deriving one signal input from said first input connection and the other signal input from said control voltage source, the signal on the output terminal of said adding circuit corresponding to the upper limit of a preset range and being applied to one input terminal of said second substracting circuit, the signal on the output terminal of said first subtracting circuit corresponding to the lower limit of a preset range and being applied to one input terminal of said third subtracting circuit, said second and third subtracting circuits each deriving their other signal input from said second input connection, said fourth subtracting circuit having one signal input terminal deriving signals from said second input connection, a first unidirectional device coupling the output terminal of said second substracting circuit to the other input terminal of said fourth subtracting circuit and poled to pass only positive signals, and a second unidirectional device coupling the output terminal of said third subtracting circuit to the other input terminal of said fourth subtracting circuit and poled to pass only negative signals.

15. In combination with first and second input connections and a control voltage source, an amplitude gate including an adding circuit having two input terminals and an output terminal, and first, second and third subtracting circuits each having two input terminals and an output terminal, said first subtracting circuit having one input terminal connected to said first input connection and having the other input terminal connected to said second input connection, said adding circuit and said second subtracting circuit each having one input terminal connected to the output terminal of said first subtracting circuit and each having the other input terminal connected to said control voltage source, said third subtracting circuit having one input terminal connected to said first input connection, a first unidirectional device coupling the output terminal of said second substracting circuit to the other input terminal of said third subtracting circuit and poled to pass positive signals, and a second unidirectional device coupling the output terminal of said adding circuit to the other input terminal of said third substracting circuit and poled to pass negative signals.

16. A noise level reduction system comprising an amplitude gate having two input connections, a control connection, and an output connection, one of said input connections being adapted to receive video signals, a source of control voltage connected to said control connection and establishing a maximum allowable range of amplitude change for said video signals, said amplitude gate including means to pass video signals having amplitudes within said range without modification and to pass video signal below and above said range as modified video signals at the lower and upper limits of said range, a memory device deriving its input from said output connection and applying its output to the second input connection of said amplitude gate, said memory device having a time delay at which coincident signal input at said input connection of an incoming video signal and a corresponding video signal after gating and delay and with or without modification is established.

17. A noise lever reduction system comprising an amplitude gate adapted to receive video signals, a source of control voltage connected to said amplitude gate to establish a maximum allowable range of amplitude change for said video signals, said amplitude gate including means to pass video signals having amplitudes within said range without modification and to pass video signals below and above said range as modified video signals at the lower and upper limits of said range, delay means deriving its input from said amplitude gate and applying its output to the input of said amplitude gate, said delay means having a time delay at which coincident signal input to said amplitude gate of an incoming video signal and a corresponding video signal after gating and delay and with or without modification is established.

18. A noise level reduction system for a television receiver comprising an amplitude gate adapted to receive video signals, means connected to said amplitude gate including means to establish a maximum allowable range of amplitude change for said video signals, said amplitude gate including means to pass video signals having amplitudes within said range without modification and to pass video signals below and above said range as modified video signals at the lower and upper limits of said range, delay means deriving its input from said amplitude gate and applying its output to the input of said amplitude gate, said delay means having a time delay at which coincident signal input to said amplitude gate of video signals separated in time by the field period of said video signals is established.

19. A system for improving the signal-to-noise ratio in a television receiver comprising a device for comparing the amplitude of an incoming signal with a corresponding previously received signal, a gating circuit for establishing predetermined limits for amplitude change in corresponding signals, and means coupled to said device and said circuit for modifying said incoming signal when the amplitude thereof falls outside of said predetermined limits for amplitude change.

References Cited in the file of this patent

UNITED STATES PATENTS 2,717,920 Avins ---------------- Sept. 13, 1955